(12) United States Patent
Nerone

(10) Patent No.: US 8,324,812 B2
(45) Date of Patent: Dec. 4, 2012

(54) PROTECTING BALLAST CIRCUITRY AGAINST MISWIRING

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 12/409,616

(22) Filed: Mar. 24, 2009

(65) Prior Publication Data

US 2010/0244702 A1 Sep. 30, 2010

(51) Int. Cl.
*H05B 39/10* (2006.01)
*G05F 1/00* (2006.01)

(52) U.S. Cl. .......................................... 315/91; 315/307

(58) Field of Classification Search .................... 315/91, 315/92, 200 R, 209 R, 246, 307, 332, 308, 315/DIG. 7; 361/54–57, 59, 90
See application file for complete search history.

(56) References Cited

U.S. PATENT DOCUMENTS

| | | | | |
|---|---|---|---|---|
| 3,818,272 A | * | 6/1974 | Rich | 361/52 |
| 5,493,180 A | * | 2/1996 | Bezdon et al. | 315/91 |
| 6,420,833 B2 | * | 7/2002 | Simpelaar | 315/112 |
| 7,235,933 B1 | * | 6/2007 | So | 315/291 |
| 7,453,268 B2 | * | 11/2008 | Lin | 324/608 |
| 7,511,930 B2 | * | 3/2009 | Apfel | 361/55 |
| 7,576,962 B2 | * | 8/2009 | Harris | 361/58 |
| 2004/0052022 A1 | | 3/2004 | Laraia | |
| 2006/0023381 A1 | | 2/2006 | Taylor | |
| 2008/0042579 A1 | | 2/2008 | Tumula et al. | |
| 2008/0192396 A1 | * | 8/2008 | Zhou et al. | 361/86 |

FOREIGN PATENT DOCUMENTS

| | | |
|---|---|---|
| EP | 0349750 A1 | 1/1990 |
| EP | 0423885 A1 | 4/1991 |
| EP | 0757420 A1 | 2/1997 |
| WO | 2008039293 A2 | 4/2008 |

OTHER PUBLICATIONS

Infineon: "SIPMOS Small Signal Transistor: BSS126", Infineon Technologies AG (www.infineon.com), Jan. 18, 2007.
PCT/US2010/023552, Search Report and Written Opinion, Jun. 16, 2010.

* cited by examiner

*Primary Examiner* — Minh D A
(74) *Attorney, Agent, or Firm* — Fay Sharpe LLP

(57) ABSTRACT

A circuit for protecting an electronic ballast for use with a remote controller for gas discharge lamps against miswiring to a power source. Depletion mode MOSFETS are employed in both sides of the circuit to the controller and the MOSFETS respond to overvoltage, including polarity reversal to create an open circuit condition in the circuit to the controller.

14 Claims, 2 Drawing Sheets

PROTECTING BALLAST CIRCUITRY AGAINST MISWIRING

BACKGROUND OF THE DISCLOSURE

The present disclosure relates to circuitry for use with the ignition of gas discharge lamps and particularly to circuitry employing an electronic ballast with circuitry for interfacing with ballast with a remote controller operative for effecting dimming of the gas discharge lamps. Presently, it is common practice to house the ballast circuitry and interface circuitry in a common housing with a set of electrical leads extending therefrom for connection to a power line such as a 120 volt/240 volt single phase AC line and another set of electrical leads for outputting a low voltage low operage signal to the dimming controller.

In service, there has been encountered instances where, despite appropriate color coding of each set of electrical leads, the low voltage signal leads intended for connection to the controller have been miswired and connected to a line voltage power source. The connection of the low voltage interface circuit leads to the line power has resulted in an over current condition and burn out of the electronic ballast circuitry.

Heretofore, attempts to protect the ballast interface circuitry and ballast against over voltage have utilized a positive temperature coefficient or PTC thermistor which responds to the higher voltage by heating and increasing the resistance thereby reducing the current flow in the interface circuit. The PTC is operable to return to its lower or cold resistance state when the overvoltage is removed thereby enabling resumption of the low voltage operation with the remote controller. However, where the circuitry is encased in a potting compound, it is necessary to isolate the PTC from the potting compound to protect the potting compound from the elevated temperatures generated by the PTC in the event of miswiring. This has resulted in added cost due to the necessity of rearranging the circuitry to isolate the PTC.

Thus, it has been desired to find a simple and relatively low cost technique for protecting the controller interface circuitry employed with an electronic ballast for a gas discharge lamp from miswiring by connecting the low voltage controller leads to a high voltage power line.

SUMMARY OF THE DISCLOSURE

The present disclosure provides a solution to the above described problem by employing depletion mode MOSFETS in both sides of the circuit for connection to the remote controller for the gas discharge lamps in a manner that utilizes the switching properties of the depletion mode MOSFETS to respond to an overvoltage, including reversal of polarity, to create an open circuit condition in the circuit to the remote controller.

In the event of miswiring the leads for the low voltage controller to the high voltage power line, upon the voltage exceeding the voltage range of the controller in the positive direction one MOSFET goes open circuit; and, upon the voltage decreasing negatively outside a low voltage threshold, the MOSFET on the opposite side of the line switches to an open circuit condition thereby protecting the interface circuitry against mis-connection to a live voltage a.c. power.

DETAILED DESCRIPTION OF THE PREFERRED EMBODIMENTS

Figure 1:
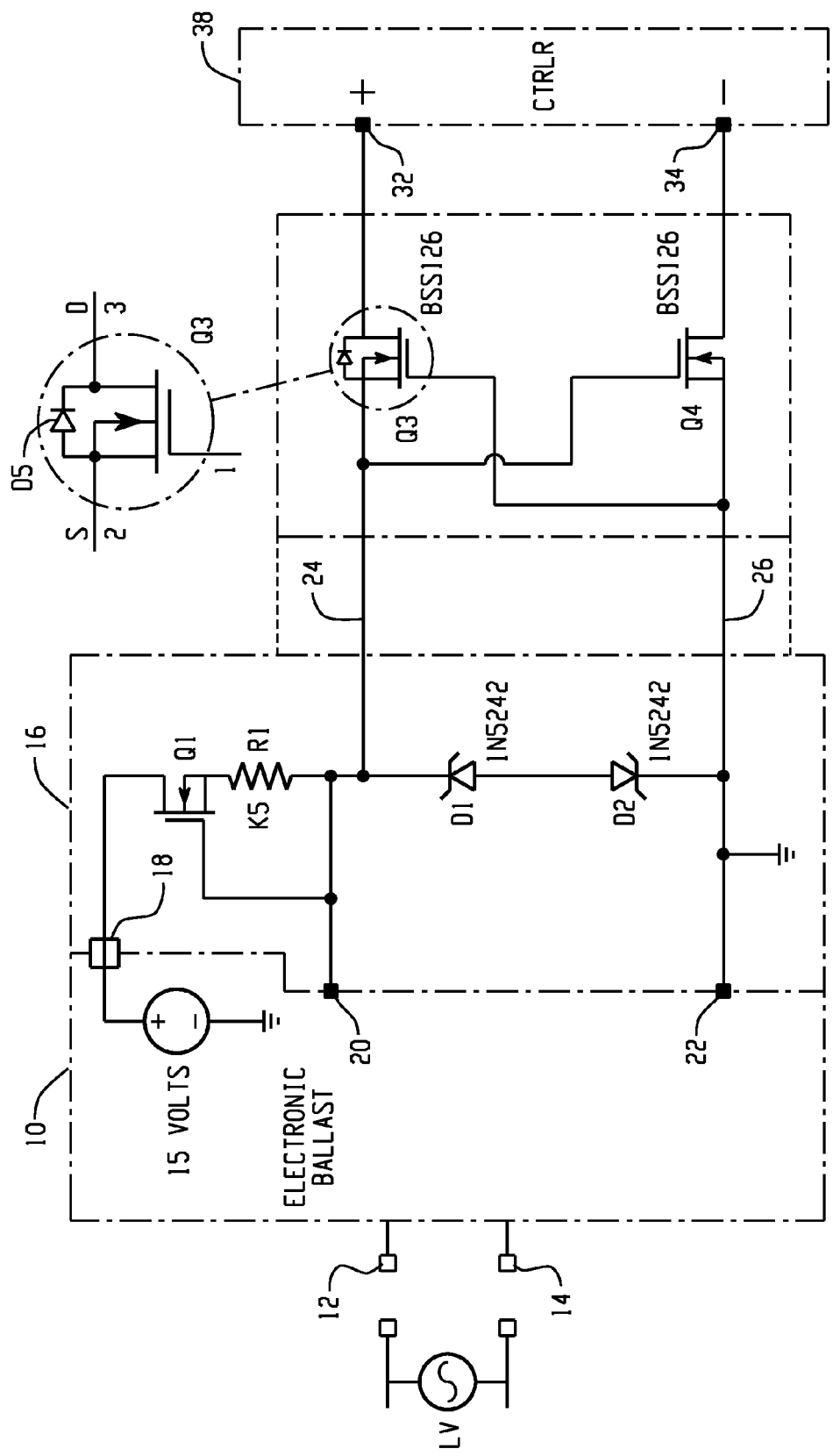
FIG. 1 is a schematic of the circuitry of the present disclosure.

Referring to FIG. 1, an electronic ballast circuit for gas discharge lamps is indicated generally in dashed outline by reference numeral 10 and may be of a conventional or well known design operative for connection at terminals 12, 14 to opposite sides of a power line indicated generally at LV. The ballast circuitry 10 is connected to an interface circuit indicated generally by reference numeral 16 which receives relatively low voltage D.C. power denoted, as for example 15 volts, from the electronic ballast and which is converted to a current level of about 500 microamps (500 µA) by transistor Q1 which may be of the MOSFET variety and current limiting resistor R1 which has a value of nominally 5 kilo ohms Zener diodes D1, D2, which may be 1N5242 devices, limit the voltage between lines 24 and 26 to about 12 Volts. The interface circuit 16 connects with the electronic ballast internally at junctions 20, 22.

The interface circuit 16 provides a relatively low current signal of about 500 microamp along lines 24, 26 to the input of a protection circuit indicated generally at 30. The circuit 30 transfers the 500 microamp current signal at output terminals 32, 34 which may be connected to respectively the positive and negative terminals of a low voltage controller indicated by dashed-dot line and reference numeral 38.

Typically, the controller 38 is of the type which provides a variable impedance or resistance in response to a sensed condition such as, for example, the movement of a control element or member by the user, or by the signal from a sensor such as a motion, photoelectric, infrared, Doppler or other condition responsive sensor. The change in impedance (unshown) of the controller provides a variable or bi-level voltage signal for changing the voltage of the interface circuit for controlling dimming of the output of the electronic ballast to the gas discharge lamps.

The positive lead 24 of the interface circuit is connected to the source of switching device Q3; and, the drain is connected to the connector terminal 32 for connection to controller 38. The gate of Q3 is connected to the opposite side 26 of the signal line. Referring to the enlarged view in FIG. 1, the device Q3 has an intrinsic diode D5 connected between the source and drain such that the device conducts so long as the voltage applied to the positive terminal in connector 32 is not greater than the 12 volt supply by virtue of the blocking diode D5. In the event a negative voltage greater than negative 12 is applied to the terminals, the upper transistor Q3 will continue to conduct; and, if the gate to source voltage is greater than its threshold voltage which is typically around −2.5 Volts, the device will be in its ON state and the current source will supply 500 microamps to the controller. As the negative voltage increases in magnitude, i.e. gets more negative, current will continue to flow at the same level, but the drain to source voltage of the lower transistor Q4 will increase; and, the device Q4 matches the amplitude of the current source at the higher voltages to until the avalanche voltage of the device is reached, which in the present practice is about 600 volts. Thus, the circuit 30 of the arrangement of FIG. 1 protects the interface circuit 16 from overvoltage, either positive or negative, in the event of miswiring a connection of terminals 32, 34 to a power line.

In the present practice, the electronic ballast circuit 10, the interface circuit 16 and the protection circuitry 30 may be incorporated into a common housing with a pair of color coded leads extending to terminals 12, 14 for a connection to a power line and with another pair of differently color coded leads extending therefrom for connection to terminals 32, 34 for connection to a remote controller.

Figure 2:
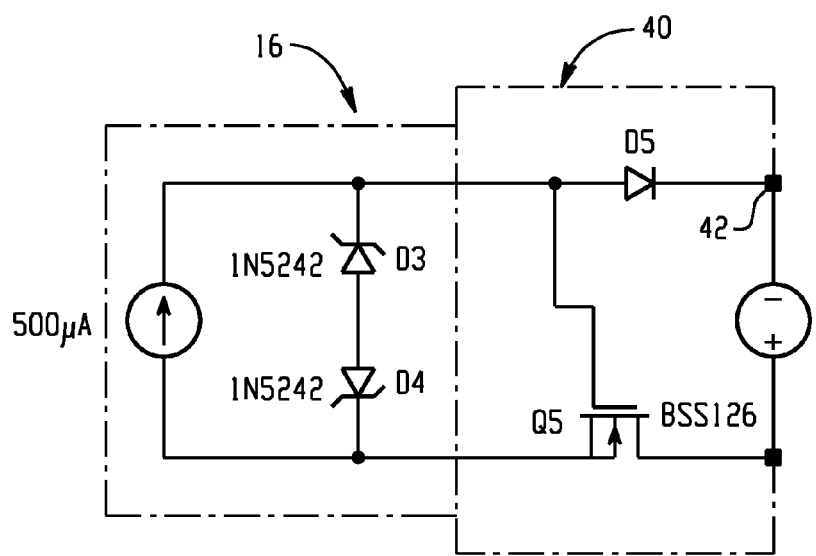
FIG. 2 is an alternate arrangement of the interface circuitry portion of FIG. 1; and, FIG. 3 is a graph of the characteristic curves of the depletion mode MOSFETS of the type employed in the present disclosure.

Referring to FIG. 2, an alternative arrangement of the interface circuit is indicated generally at 40 and has about 500 microamps of current supplied from the interface circuit 16 with diodes D3, D4 connected across the line thereof. Protection circuitry 40 of the arrangement of FIG. 2 has a switching device Q5 connected in the negative side of the 12 volt signal line similar to the switching device Q4 of FIG. 1, which device Q5 may also be of the depletion mode MOSFET type. In the arrangement of FIG. 2 the positive side of the line 42 has a diode D5 connected therein; and, upon miswiring and application of a high voltage to the terminal 42, the diode continues to conduct current flow in the line. The voltage on switching device Q5 continues to increase until an avalanche condition occurs as in paragraph.

The drain to source voltage of the device Q5 will be able to increase with the external voltage and prevent the device Q5 from switching to open circuit. If the polarity of the external source is reversed, D5 will block if this voltage exceeds about 12 Volts. The difference is that the version of FIG. 1 will not have a diode drop because the channel of Q3 will continue to conduct until the threshold voltage is reached. In this way, the version of FIG. 1 has better linearity, especially at low controller voltages, i.e. voltages below 2.5 Volts.

Figure 3:
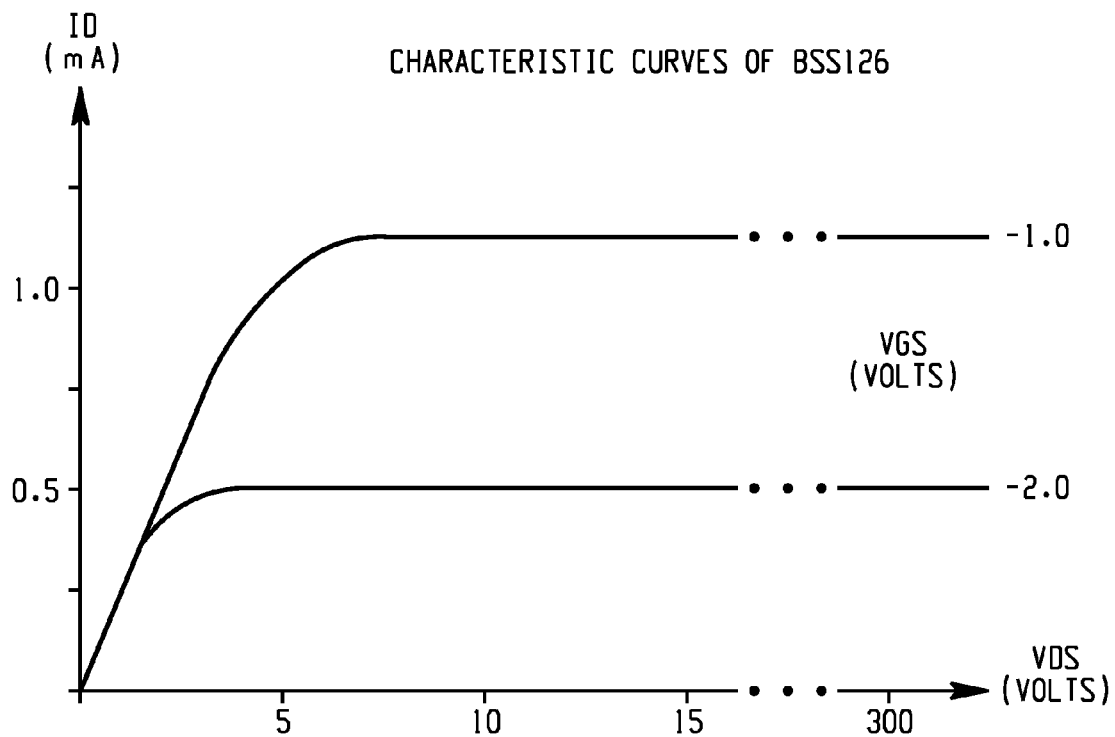

Referring to FIG. 3, typical characteristics of the type BSS 126 switching devices employed are shown where it is noted that the current is maintained, substantially constant so long as the gate voltage is maintained irrespective of the source to drain voltage.

The present circuitry provides unique low cost and simple additions to an electronic ballast and interface circuitry for gas discharge lamps where it is desired to connect a controller for dimming the lamps to the circuitry and to provide protection in the event the ballast is miswired to the power line.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method of protecting an electronic ballast for a gas discharge lamp comprising:
   (a) connecting a voltage interface circuit intermediate a control circuit and the electronic ballast;
   (b) disposing a protection circuit including first and second circuit branches extending between the voltage interface circuit and the controller connection with a voltage responsive depletion mode MOSFET switch in circuit with the first branch and a diode in circuit in the second branch; and,
   (c) automatically opening said voltage responsive depletion mode MOSFET switch when one of (i) an overvoltage condition occurs and (ii) the controller connection is connected to a reverse polarity power source, and when a power source voltage at the controller connection is one of (i) less than −2 volts and (ii) greater than +10 volts.

2. The method defined in claim 1, wherein disposing a voltage responsive switch includes disposing the depletion mode MOSFET switch with the source and drain series connected in the first branch.

3. The method defined in claim 2, wherein disposing a depletion mode MOSFET switch includes connecting a gate junction thereof to the second branch of the protection circuit.

4. The method defined in claim 1, wherein connecting the voltage interface circuit and the controller to the circuit includes connecting circuitry requiring about 500 μ amperes current flow.

5. The circuit defined in claim 1, wherein the depletion mode MOSFET switch is operative to open automatically when the voltage is one of (i) less than −2 volts and (ii) greater than +12 volts.

6. A circuit for protecting an electronic ballast with controller for use with a gas discharge lamp comprising:
   (a) a voltage interface circuit powered by the electronic ballast and connected intermediate the electronic ballast and a controller; and,
   (b) a protection circuit including first and second circuit branches extending between the voltage interface circuit and the controller connection with a series depletion MOSFET switch disposed in the first branch and a diode in the second branch of the line between the voltage interface circuit and the controller, wherein the depletion MOSFET switch is operative to open automatically upon the occurrence of one of (i) an overvoltage at the controller connection and (ii) a reverse polarity connection to the controller connection, and when a power source voltage at the controller connection is one of (i) less than −2 volts and (ii) greater than +10 volts.

7. The circuit defined in claim 6, wherein series depletion MOSFET switch includes a diode.

8. The circuit defined in claim 6, wherein the depletion mode MOSFET switch is operable according to the following

| Voltage Vc | D5 | Q5 |
| --- | --- | --- |
| $-1 \leq V_c < 0$ | conducts | ON |
| $V_c < -1$ | conducts | ON with current limited to 500 μA |
| $V_c > 12$ | blocks | ON |
| $0 \leq V_c < 12$ | conducts | ON | where $V_c$ is the voltage applied to the controller connection, $D_5$ is the diode and $Q_5$ is the depletion mode MOSFET switch.

9. The circuit defined in claim 6, wherein the depletion mode MOSFET switch is operable according to the following

| Voltage Vc | Q3 + D5 | Q4 |
| --- | --- | --- |
| $V_c < -1$ | ON | conducts with current limited to 500 μamps |
| $-1 \leq V_c < 2.0$ | ON | ON |
| $2.0 \leq V_c < V_{Ref}$ | ON | ON |
| $V_c > V_{Ref}$ | $D_5$ blocks | ON | where $V_c$ is the voltage applied to the controller connection, $Q_3+D_5$ is one of the depletion mode MOSFET switching devices with an intrinsic diode $D_5$ shunting the source and drain terminals thereof and connected in a positive branch of the controller, $Q_4$ is another of the depletion mode MOSFET switching devices connected in a negative branch of the controller connection.

10. A circuit for protecting an electronic controllable ballast for use with a gas discharge lamp comprising:
(a) a ballast interface circuit receiving power from the ballast and providing a relatively low voltage output for connection to a voltage controller;
(b) a protection circuit including first and second circuit branches extending between the ballast interface circuit and the voltage controller connection with at least one voltage responsive depletion mode MOSFET switching device disposed in one of the first and second branches and a diode in the other of the first and second branch between the ballast interface circuit and the voltage controller, wherein the voltage responsive depletion mode MOSFET switching device is operable to switch to an open circuit state upon the voltage controller connection being connected to one of (i) an overvoltage, and (ii) a negative voltage greater than −2 volts.

11. The circuit defined in claim 10, wherein the depletion mode MOSFET switching device is operable to switch open circuit when the voltage is in excess of +12 volts.

12. The circuit defined in claim 10, wherein the depletion mode MOSFET switching device is operable to switch to an open circuit during the intervals of an alternating current voltage when the voltage at the controller connection is less than −2 volts.

13. The circuit defined in claim 10, wherein the depletion MOSFET is connected in a negative potential branch of the protection circuit and the diode is connected in a positive potential branch of the protection circuit.

14. The circuit defined in claim 10, wherein the depletion mode MOSFET switching device operates on 500 μ amperes current flow.

* * * * *